United States Patent [19]
Bauer

[11] Patent Number: 5,630,266
[45] Date of Patent: May 20, 1997

[54] METHOD AND APPARATUS FOR MAKING INTEGRAL SUPPORT PLATES FOR CHAIR SEATS

[76] Inventor: Helmut Bauer, 65 Colton Crescent South, Woodbridge, Ontario, Canada, L4L 3L7

[21] Appl. No.: 515,977

[22] Filed: Aug. 16, 1995

[30] Foreign Application Priority Data

May 5, 1995 [CA] Canada .................................. 2148736

[51] Int. Cl.⁶ .................................................. B23P 17/00
[52] U.S. Cl. ........................ 29/417; 29/426.3; 29/33 Q; 29/33 S; 72/405.06
[58] Field of Search ............................ 29/412, 414, 415, 29/417, 426.3, 897, 34 R, 563, 564, 56.5, 650, 33 Q, 33 S; 72/404, 339, 405.06; 83/55, 255

[56] References Cited

U.S. PATENT DOCUMENTS 1,990,718  2/1935  Swanstrom .................. 29/417
5,271,140  12/1993  Futamura et al. .................. 29/33 Q
5,526,668  6/1996  Futamura et al. .................. 29/33 Q

*Primary Examiner*—David P. Bryant
*Attorney, Agent, or Firm*—Shoemaker and Mattare, Ltd.

[57] ABSTRACT

A method and apparatus for making a plurality of integral support plates for chairs, involving passing a strip of metallic material along a forming line and carrying our a series of operations on the strip, including: piercing and lancing holes, removing material adjacent the holes to permit use of a strip carrier, and cutting notches in opposed longitudinal sides at a first stage; then lancing the strip along two substantially transverse lines extending inwardly to the lancing holes; then carrying out a plurality of sequential operations for creating an integral, closed-ended sleeve projecting from the plate. A subsequent stage involves piercing the closed end of the sleeve and trimming away excessive edge material around the plate. At a later stage, reinforcement ribs are provided, along with any additional profiles that are needed. Then, mounting holes and any required slots are pierced. Finally, the completed support plate is cut from the strip.

7 Claims, 16 Drawing Sheets

STATION #1
PIERCE 2 HOLES FOR LANCE
CAT CLEARANCE FOR CARRIER (HALF)
NOTCH 2 PLACES FOR SAFETY SWITCH

STATION #2
CUT THE OTHER HALF OF CLEARANCE FOR CARRIER

STATION #3
LANCE 2 PLACES TO RELIEF MATERIAL FOR FORM

STATION #4
FIRST FORM (BUBBLE-4B)

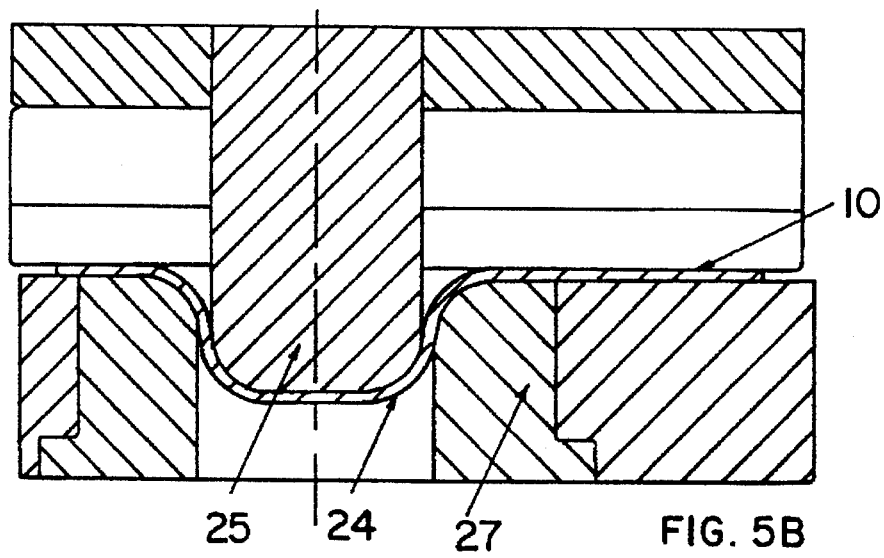
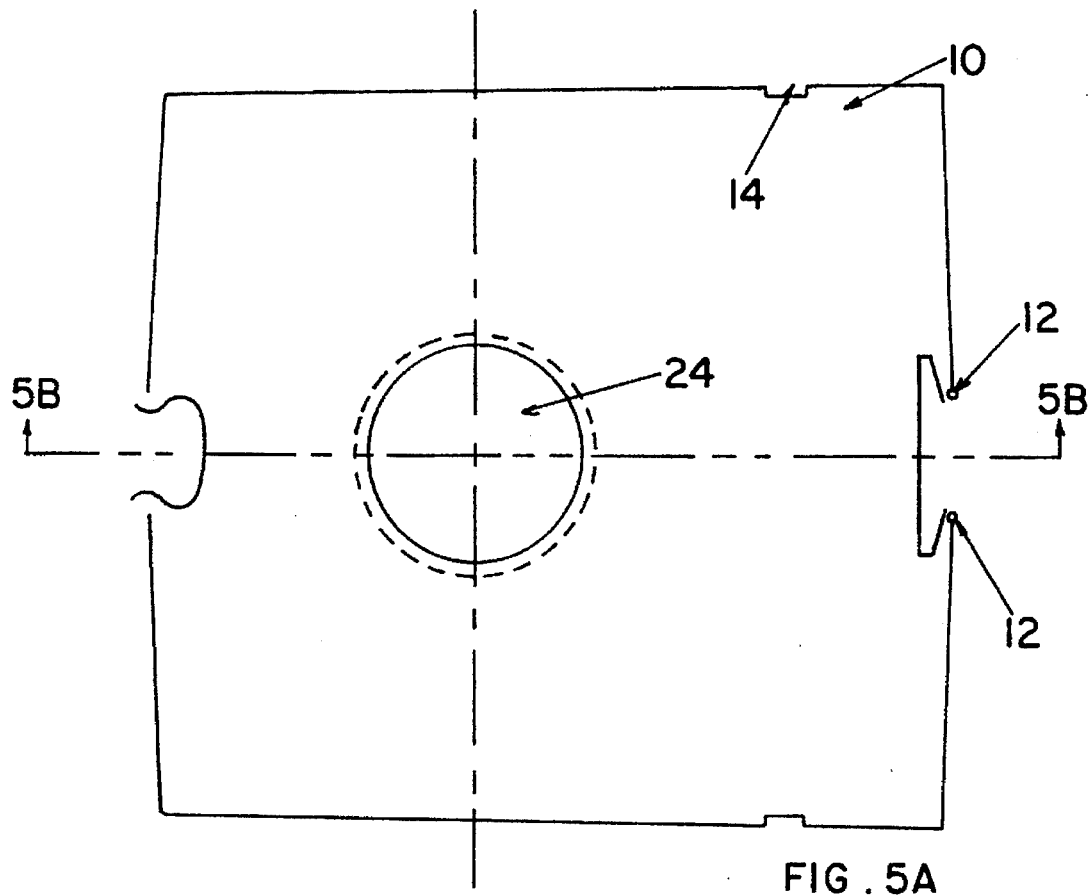
FIG. 5B
FIG. 5A
STATION #5
SECOND FORM

STATION #6
THIRD FORM

STATION #7
FOURTH FORM

STATION #8
FIFTH FORM

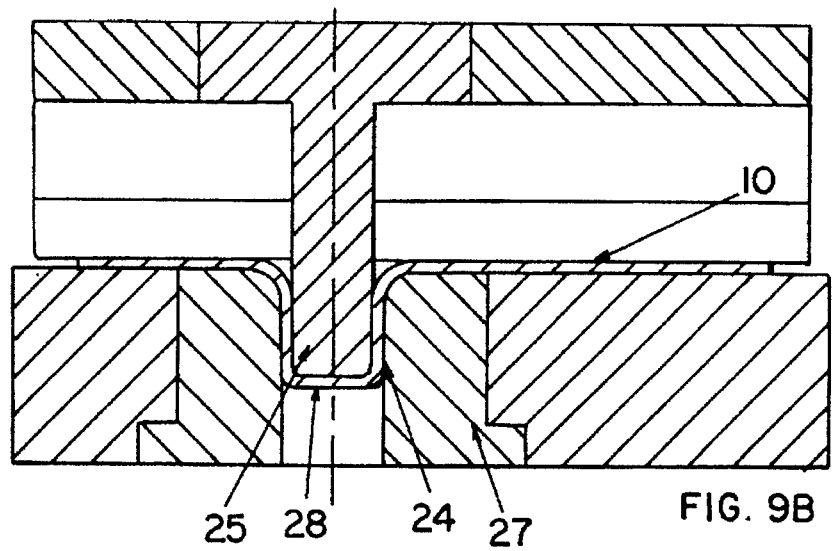
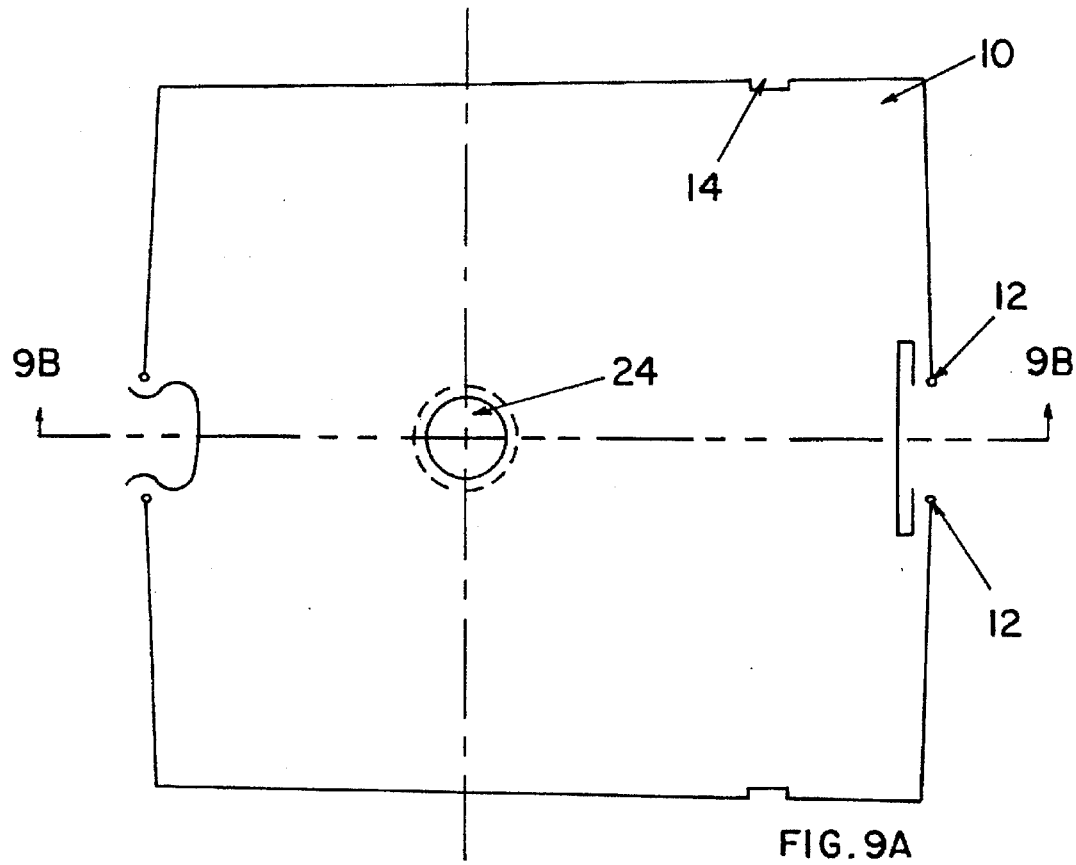
STATION # 9
FINAL FORM FOR CENTER EXTRUSION

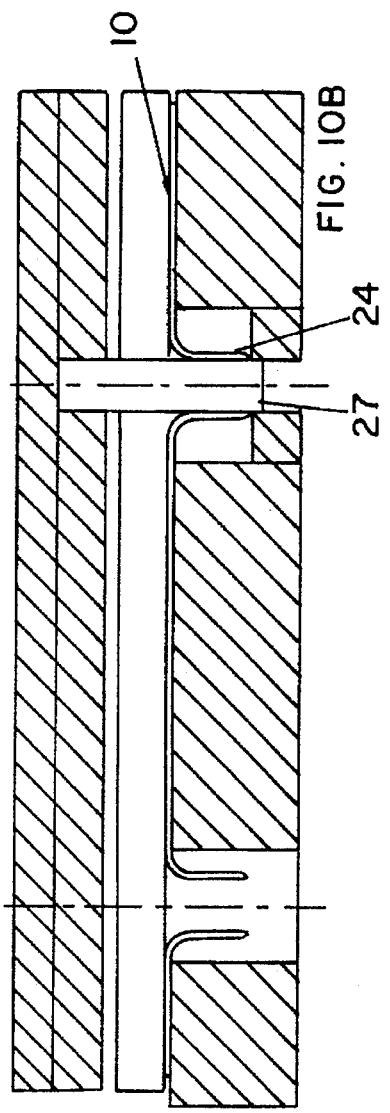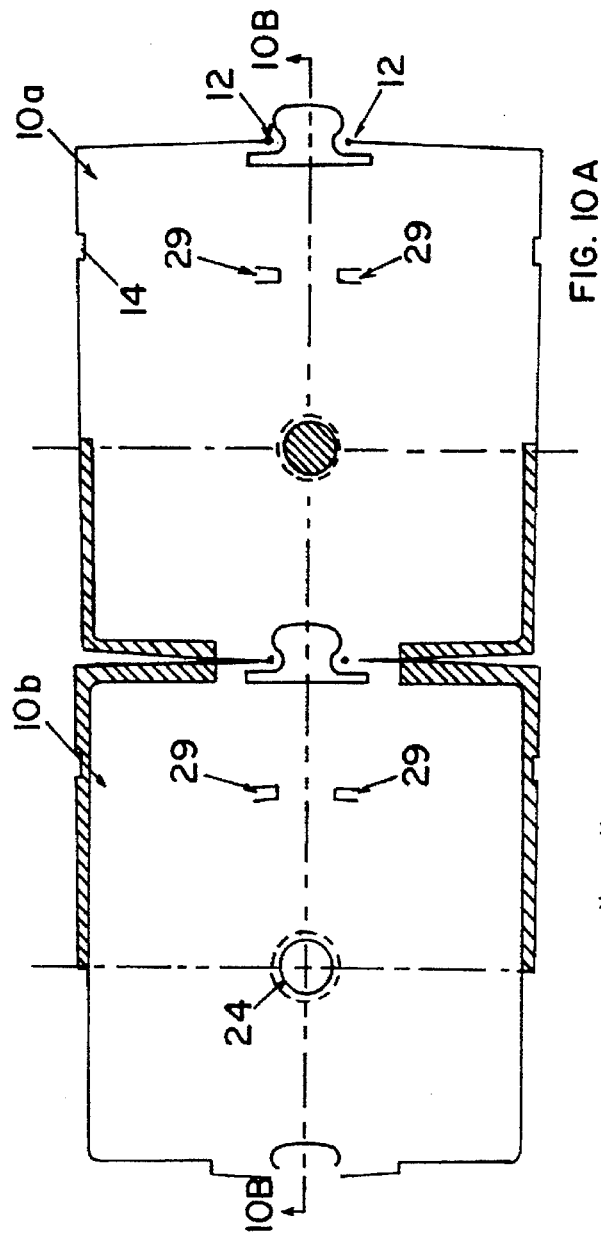
FIG. 10B
FIG. 10A
STATION #10 & #11
PIERCE THROUGH EXTRUSION, TRIM ALL
OUTSIDE PROFILE AND LANCE TABS

STATION #12
FORM ALL PROFILE OF PART & TILT
3° ANGLE

STATION #13
TAPER CENTER EXTRUSION HOLE

STATION #14
PIERCE SLOT & SCREW MOUNTING HOLES

STATION #15
PIERCE HOLE FOR HEIGHT
ADJUSTMENT LEVER

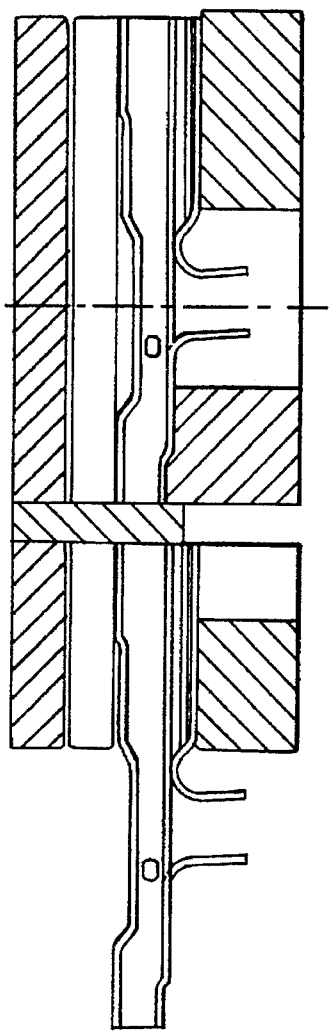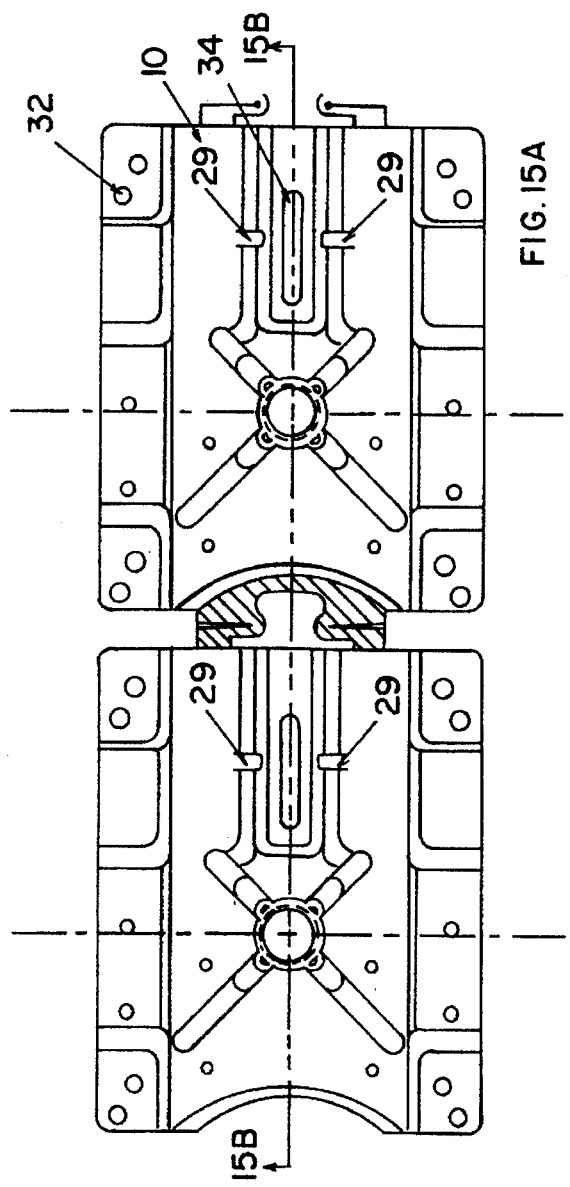

METHOD AND APPARATUS FOR MAKING INTEGRAL SUPPORT PLATES FOR CHAIR SEATS

This invention relates to a method and apparatus for making, from a strip of deformable metallic material, a plurality of integral support plates for use in constructing chair seats, and in particular office chairs including steno chairs. Typically, such a plate is used to support the seat and back of the chair.

GENERAL BACKGROUND

The conventional construction of support plates includes a deformed steel plate with an extrusion surrounding a circular opening, a flared steel tube, and a height adjustment lever. Usually, a formed piece of steel wire with a pivot point and a plastic handle serves as the height adjustment lever. The metal plate is typically blanked and formed in a series of individual dies, or alternatively it may be processed through one die with multiple stations incorporating all of the operations necessary to achieve the desired specification and performance of the part.

The steel tube is precut to a specific length, and deburred. It is then flared, and the inside dimension of the tube is sized to accept a centre post or cylinder assembly. The sizing operation is usually done in a forming die. To produce a seat plate assembly, the flared steel tube is located through the extrusion in the metal plate, and welded in place. The adjustment lever is pushed through a pierced opening in the side of the plate, and the end of the wire is centred over the flared tube. The lances in the plate are then formed over the pivot pin to secure the lever to the plate and ensure proper operation.

Alternative prior art seatplate assemblies incorporate a plate along with varying numbers of brackets, a tube and a lever as part of the seat mechanism. Such assemblies are prone to fracturing at the location of the weld bead around the flanged tube where it meets the plate. The safety of such prior devices is currently under review as a result of several accidents and subsequent lawsuits.

GENERAL DESCRIPTION OF THIS INVENTION

In view of the shortcomings of the conventional construction for support plates of this kind, it is the object of an aspect of this invention to provide an improved method of manufacturing support plates, and an apparatus for carrying out the method. In particular, the apparatus and method to be disclosed herein do not require any welding step.

More particularly, this invention provides a method of making a plurality of integral support plates for use in constructing chair seats, the method comprising passing a strip of deformable metallic material along a forming line and carrying out a series of operations on the strip, the operations being experienced by the strip as a predetermined sequence of groups of operations, each group containing one or a plurality of operations, the groups including, in order:

a) a first group comprising, in any order:
   piercing two laterally spaced-apart lancing holes in the middle region of the strip,
   removing material adjacent to the holes to provide an opening for a strip carrier, and
   providing a modality adjacent at least one of said opposed longitudinal sides for cooperation with a safety switch;
b) a second group having the effect of lancing the strip along two substantially transverse lines reaching from the longitudinal sides to the corresponding lancing holes, thus facilitating the flow of strip material during subsequent operations, said transverse lines generally identifying the rearward edge of one plate and the forward edge of the next subsequent plate;
c) a third group comprising a plurality of sequential operations for creating, in the general mid-region of each plate, an integral, cylindrical, closed-ended sleeve of which the axis extends substantially perpendicular to the plate, said sequential operations utilizing a plurality of sets of male and female die members, the sequential operations commencing with the formation of a relatively shallow, wide bubble in the respective plate, followed by the deepening and narrowing of the bubble by the sequential operation of said sets of die members;
d) a fourth group comprising, in any order:
   using a piercing tool to remove the closed end of the sleeve, and
   trimming away excessive edge material so as to give each support plate a desired peripheral configuration;
e) a fifth group comprising, simultaneously or in any order:
   forming reinforcement rib means adjacent the junction of the sleeve with the respective plate, and
   forming any required additional profiles in the plate;
f) a sixth group comprising, in any order:
   piercing all required mounting holes in the plate, and
   piercing all required slots in the plate; and
g) a seventh group comprising cutting the completed support plate from the strip.

Furthermore, this invention provides apparatus for making a plurality of integral support plates for use in constructing chair seats, the apparatus defining a forming line along which a strip of malleable metallic material can be passed, the apparatus being adapted to carry out a series of operations on the strip, the operations being experienced by the strip as a predetermined sequence of groups of operations, each group containing one or a plurality of operations, the apparatus comprising groups of mechanisms arranged along the forming line in the order in which they are experienced by the moving strip, said groups of mechanisms including, in order:

a) a first group comprising, for use in any order:
   piercing means for piercing two laterally spaced-apart lancing holes in the middle region of the strip,
   punching means for removing material adjacent to the holes to provide an opening for a strip carrier, and
   means for providing a modality in the opposed longitudinal sides for cooperation with a safety switch;
b) a second group including lancing means for lancing the strip along two substantially transverse lines reaching from the longitudinal sides to the corresponding lancing holes, thus facilitating the flow of strip material during subsequent operations, said transverse lines generally identifying the rearward edge of one plate and the forward edge of the next subsequent plate;
c) a third group comprising a plurality of sets of male punches and corresponding female dies, said sets being adapted to create, in the general mid-region of each plate, an integral, cylindrical, closed-ended sleeve of which the axis extends substantially perpendicular to the plate, the creation of the close-ended sleeve being accomplished by sequential operations commencing with the formation of a relatively shallow, wide bubble in the respective plate, followed by the deepening and narrowing of the bubble by the sequential operation of said sets of die members;
d) a fourth group comprising:

a piercing tool to remove the closed end of the sleeve, and trimming means for trimming away excessive edge material so as to give each support plate a desired peripheral configuration;

e) a fifth group comprising:

punch and die means for forming reinforcement rib means adjacent the junction of the sleeve with the respective plate, and for forming any required additional profiles in the plate;

f) a sixth group comprising, in any order:

further piercing means for piercing all required mounting holes in the plate, and for piercing all required slots in the plate; and g) a seventh group comprising cutter means for cutting the completed support plate from the strip.

GENERAL DESCRIPTION OF THE DRAWINGS

One embodiment of this invention is illustrated in the accompanying drawings, in which like numerals denote like parts throughout the several views, and in which:

FIGS. 1A through 15A are sequential plan views of a portion of a strip of deformable metallic material from which a plurality of integral support plates are to be manufactured;

FIG. 1B through 15B are longitudinal sectional views taken at the lines 1B—1B through 15B—15B, respectively.

DETAILED DESCRIPTION OF THE DRAWINGS

The major thrust of the present development is the desire to eliminate the steel tube as a separate item, thus eliminating the welding operation by which the steel tube is typically affixed to the plate. A further aspect of this invention is the provision of a process capable of consistently producing parts that are reliable, safe and economical to use, and that meet or exceed the testing standard established by The Business and Institutional Furniture Manufacture's Association (BIFMA).

The BIFMA standard defines specific tests, laboratory equipment, testing conditions, recommended minimum levels to be used in the tests and close up evaluation of the safety, durability, and structural adequacy of general purpose office chairs.

The cycle test commonly used in industry for seatplates involves a minimum of 180,000 cycles of rocking motion from side to side with a 250 pound steel block on the chairseat, and 180,000 cycles of rocking motion from front to back with the same load on the chairseat. The movement must be two inches in either direction from a centre pivot point located eighteen inches above the chairseat.

The seatplate described hereinafter, constructed in accordance with this invention, was tested under the usual conditions, and completed 275,000 cycles without any sign of structural breakage.

Turning now to the drawings, it is to be noted particularly that the Figure numbers from 1 through 14 correspond to the "station" numbers in the forming line along which an elongate strip 10s of metallic material (usually steel) passes.

Figure 1B:
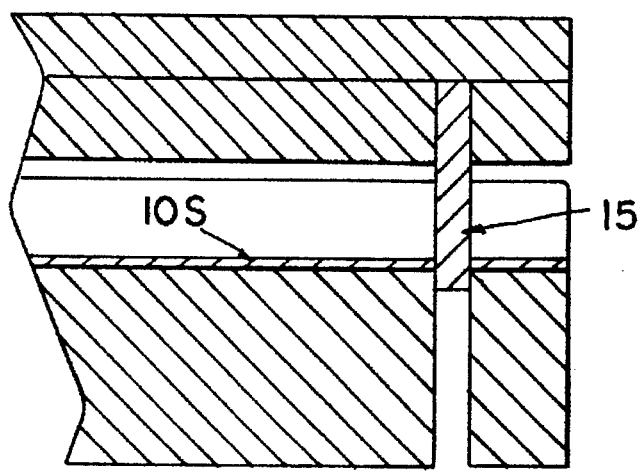
Figure 1A:
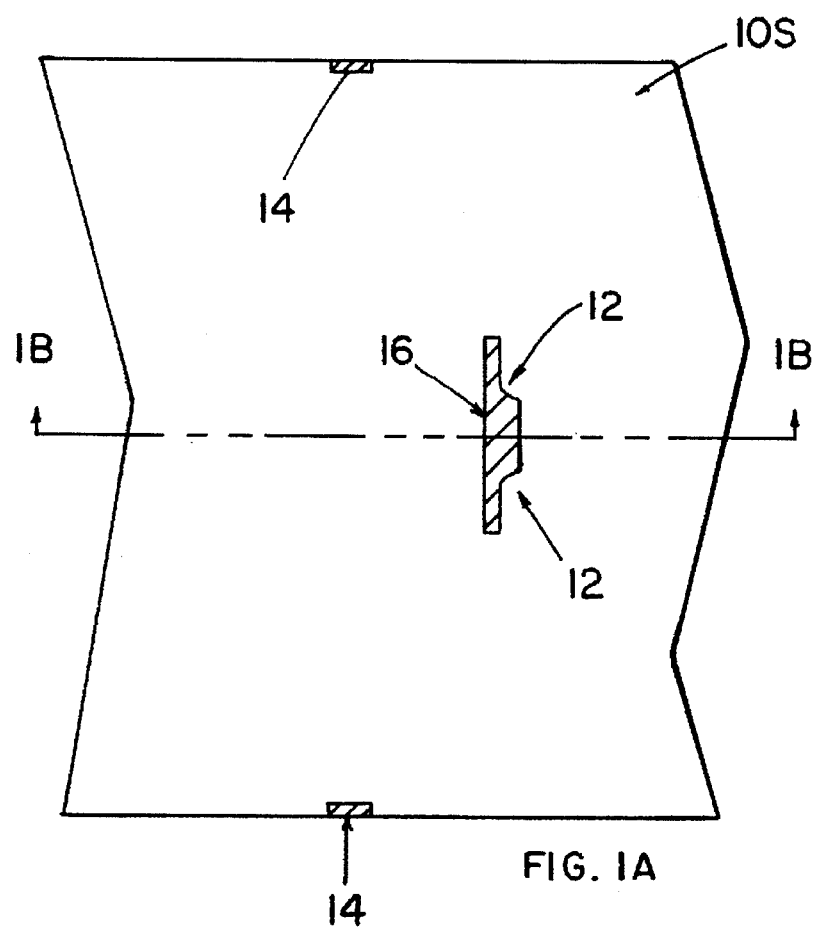

FIGS. 1A and 1B are, respectively, a top plan view and a longitudinal sectional view of a portion of the strip 10s as it appears after the operation has taken place at station number 1.

The strip 10s is shown with two pierced holes 12 for use in a subsequent step involving lancing, and two notches 14 cut at the outer edges of the strip 10s. The purpose of the notches is for the activation of a safety switch. Also carried out at the first station (FIG. 1A) is the removal, by a punch 15, of part 16 of the strip 10s, this being one portion of the clearance required for the strip carrier.

Figure 2B:
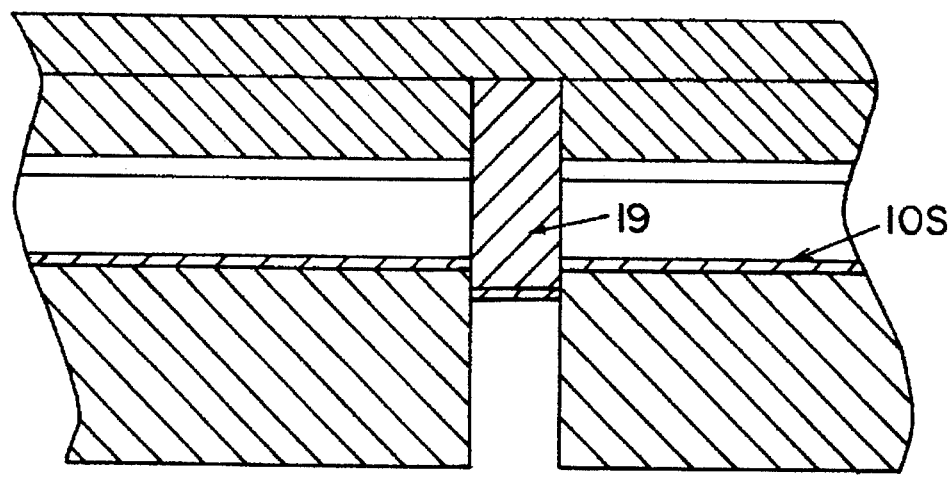
Figure 2A:
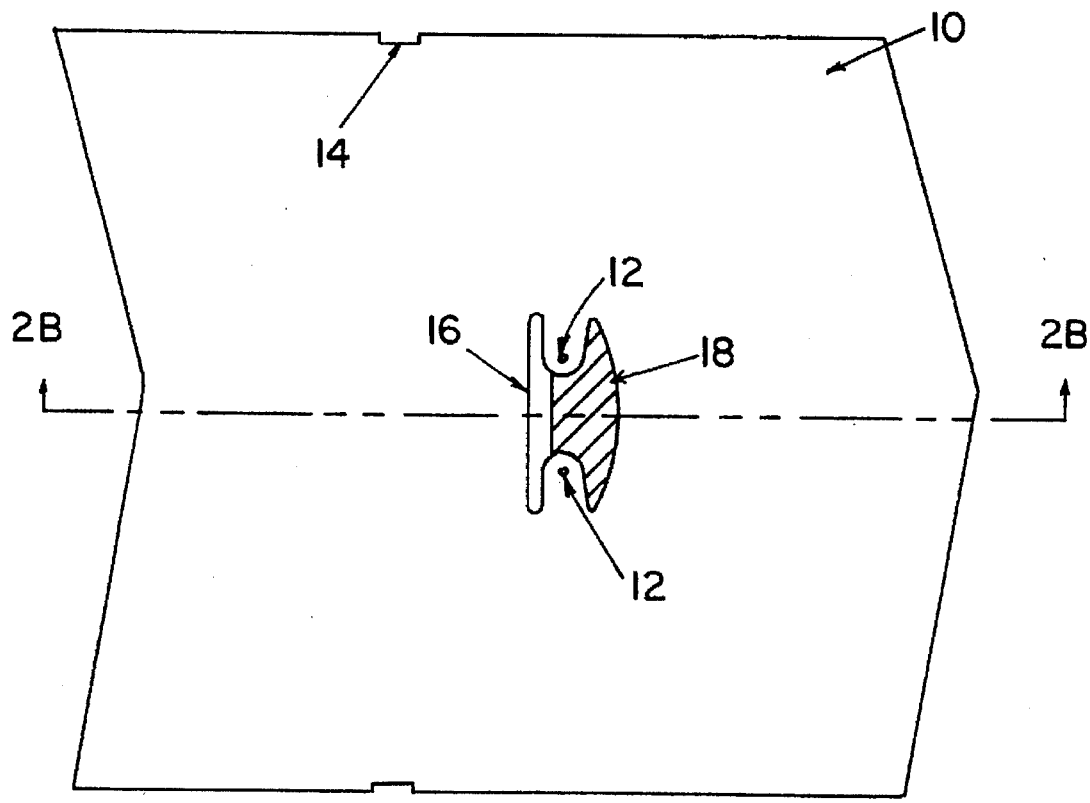
Figure 3B:
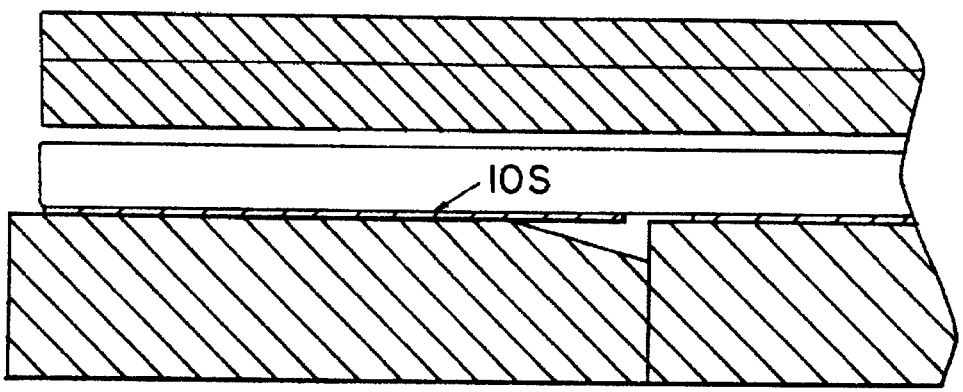
Figure 3A:
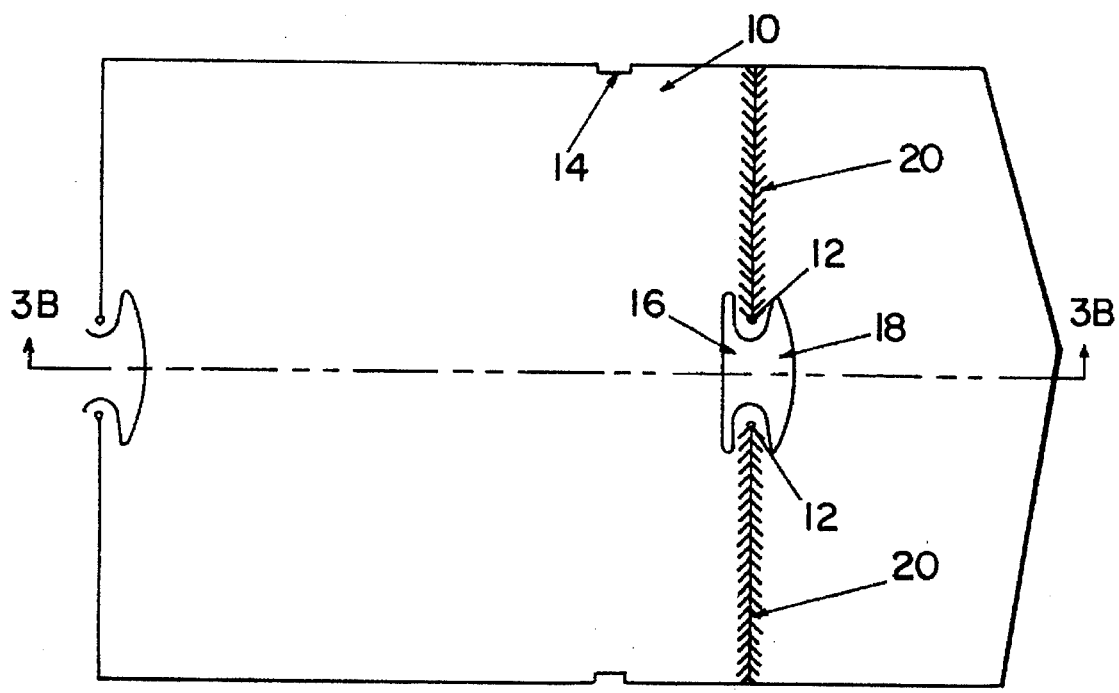

At station number 2 the other half 18 of the carrier clearance is cut away by a punch 19, as indicated in FIGS. 2A and 2B.

At station number 3, a lancing blade places chevron-shaped slits in the strip 10s, stretching along two substantially transverse lines 20 reaching from the longitudinal sides of the strip inwardly to the corresponding lancing holes 12. The lanced slits in the strip 10s define a plurality of plates, which will be identified below by the numeral 10.

Figure 4B:
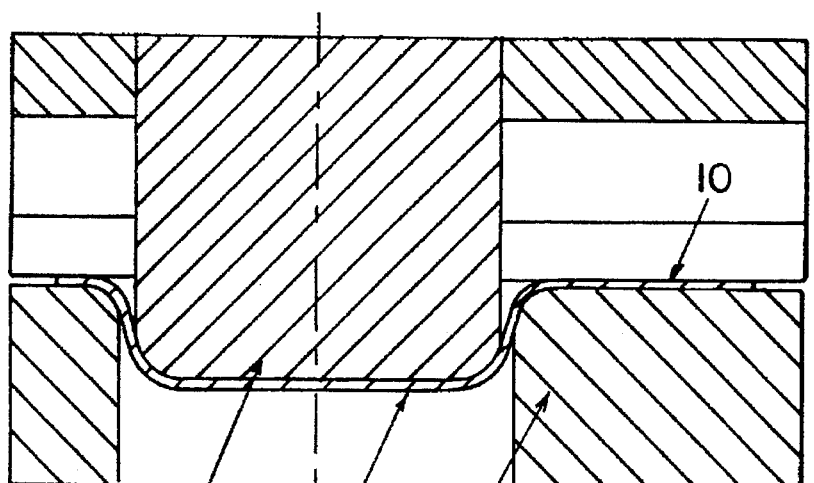
Figure 4A:
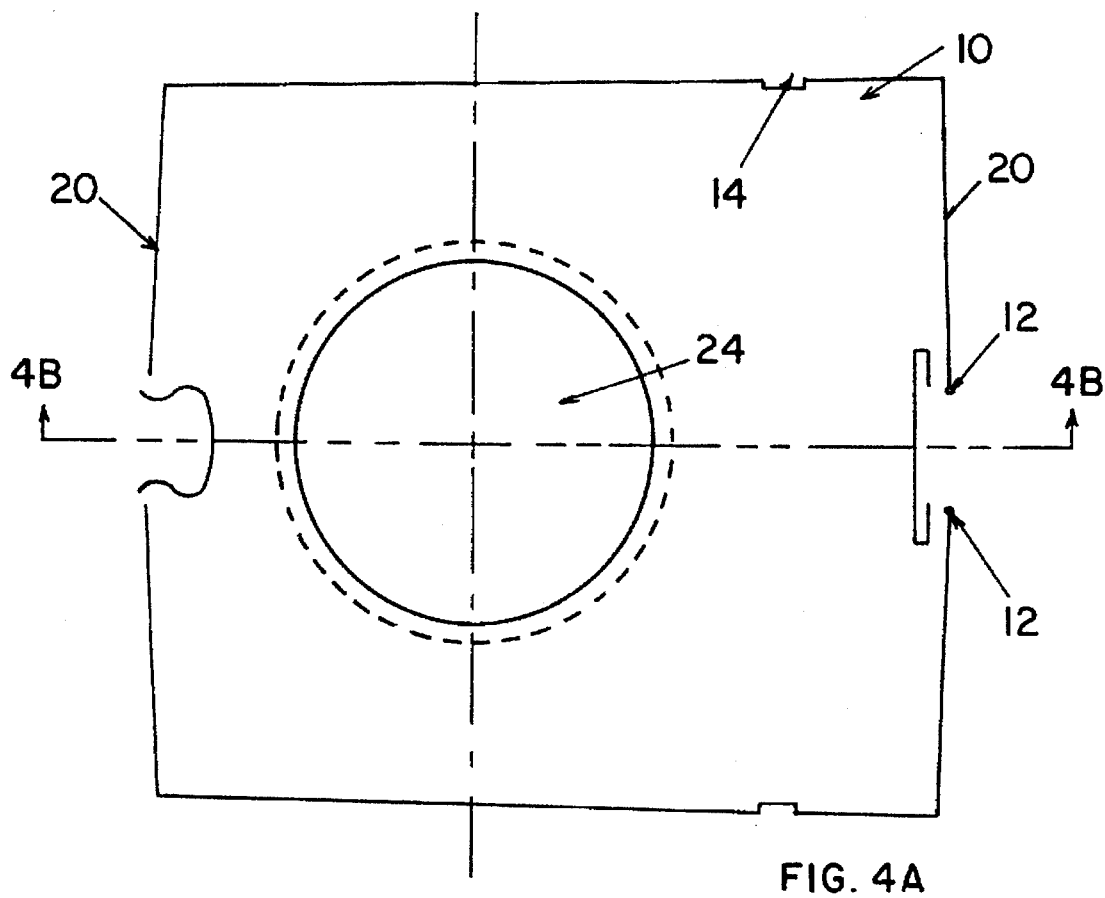
Figure 6B:
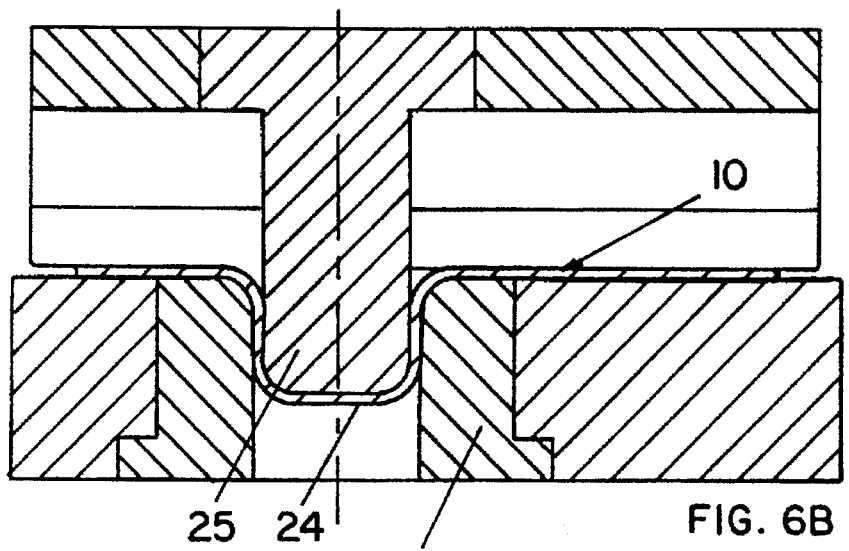
Figure 6A:
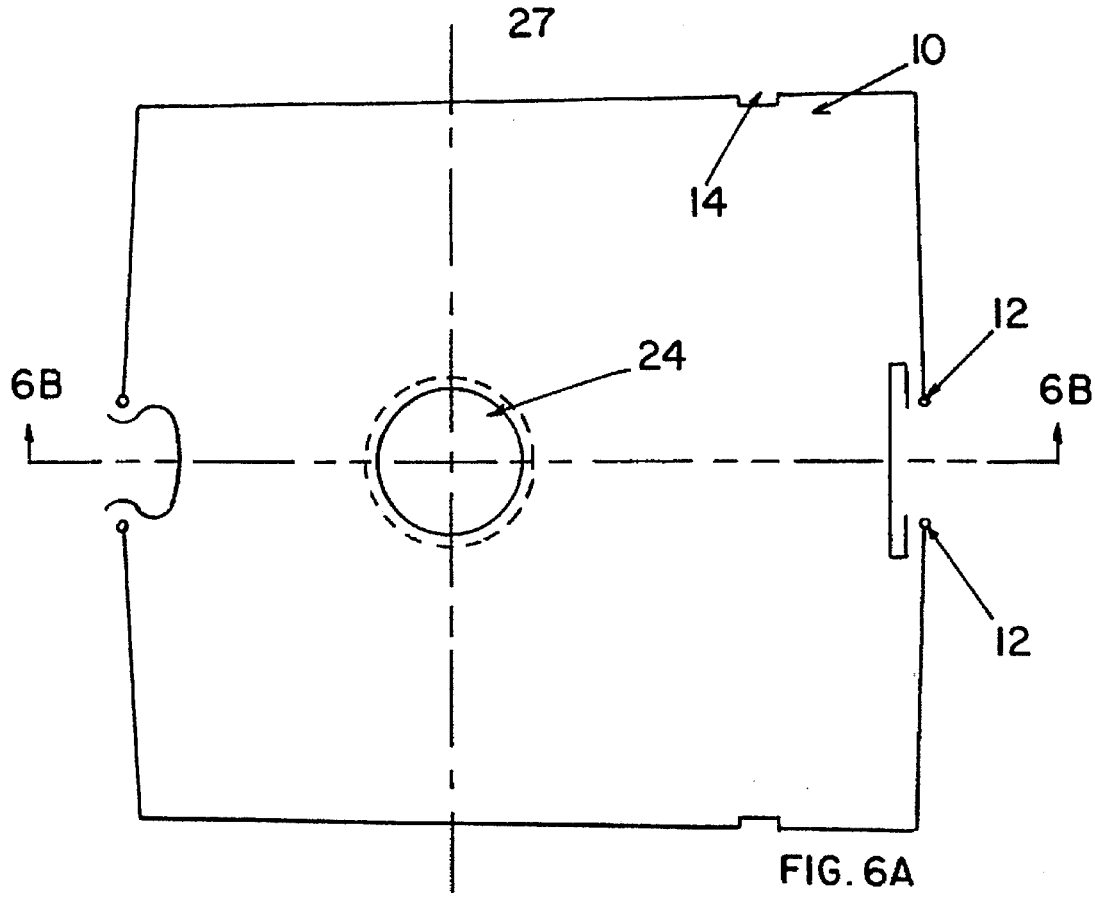
Figure 7B:
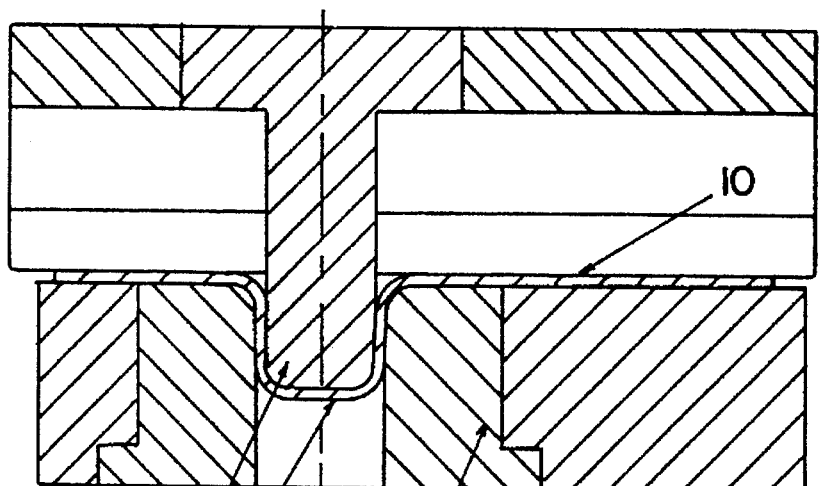
Figure 7A:
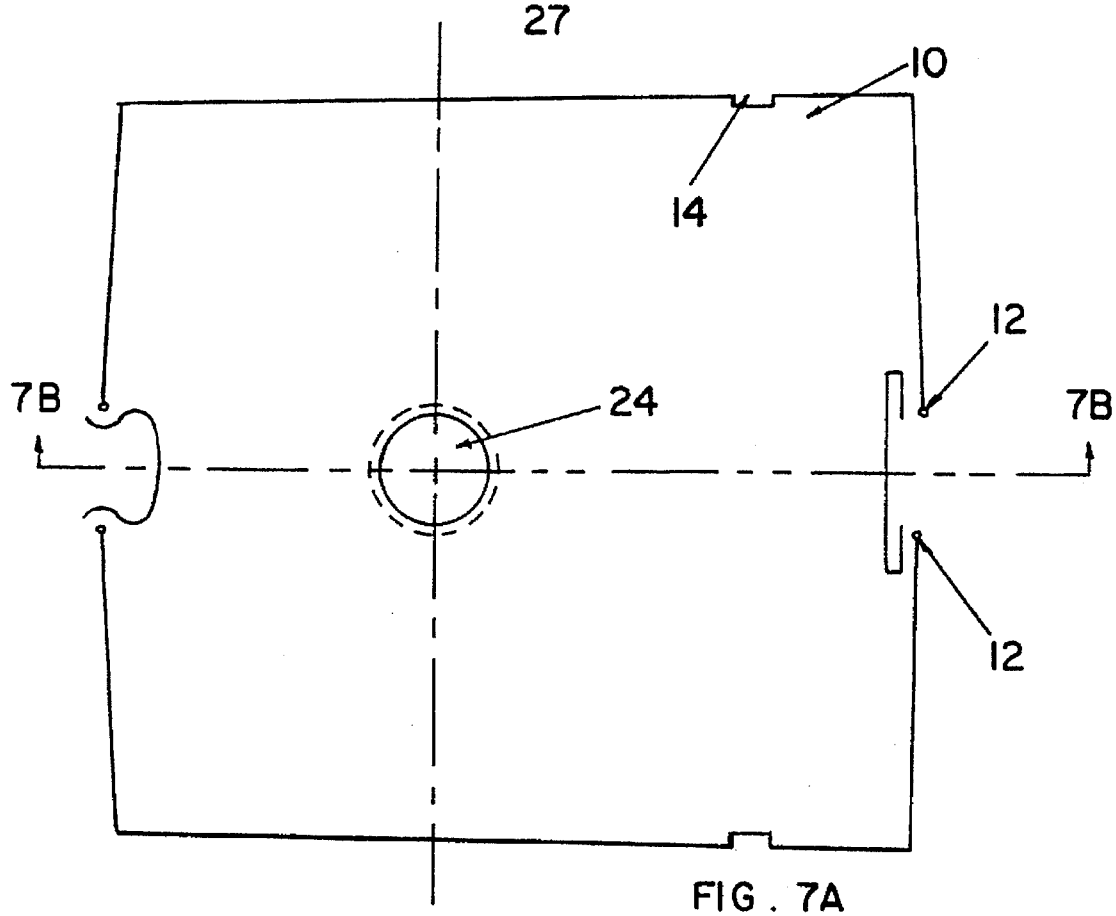

Stations 4 through 9, illustrated in FIGS. 4A,B to 9A,B, have the effect of creating, in the general mid-region of each plate 10 (defined between each pair of sequential lancing lines 20), an integral, cylindrical, closed-ended sleeve of which the axis extends substantially perpendicular to the plate 10. These sequential operations utilize a plurality of sets of round-edged male and female die members 25 and 27, respectively. The operations commence with the formation of a relatively shallow, wide bubble 24 (FIGS. 4A and 4B), following which the bubble 24 is gradually deepened and narrowed, in step-wise stages, until the initial bubble 24 and the surrounding material of the plate 10 have been deformed to create a relatively narrow sleeve which is integral with the plate 10.

At the end of the sequential deformation operations, represented in FIGS. 9A and 9B, the bubble 24 has now become an integral, cylindrical, closed-ended sleeve of which the axis extends substantially perpendicular to the plate 10. Since the bubble 24 has become the sleeve, the numeral "24" will be retained, in the remainder of this specification, as that referring to the integral sleeve.

It is pointed out that the sleeve 24, illustrated in FIG. 9B, has a closed end 28.

The next operation, illustrated in FIGS. 10A and 10B, is to utilize a piercing tool 27 in order to remove the closed end 28 of the sleeve 24. Also, two retaining safety tabs 29 are lanced to prevent the back upright (not illustrated) from shifting from side to side if the knob is loose. At the same stage, excessive edge material is trimmed away so as to give each support plate a desired peripheral configuration. More specifically, looking at FIG. 10A, each trimming step involves removing the edge material around the rear half of a given plate 10a, and around the front half of the next subsequent plate 10b. Because the trimming and the piercing operations are independent of each other, there is no particular order in which they have to be carried out.

Figure 11B:
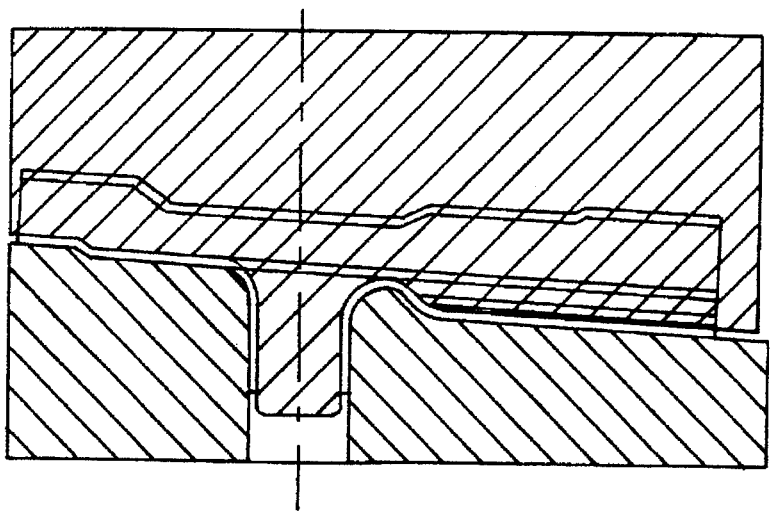
Figure 11A:
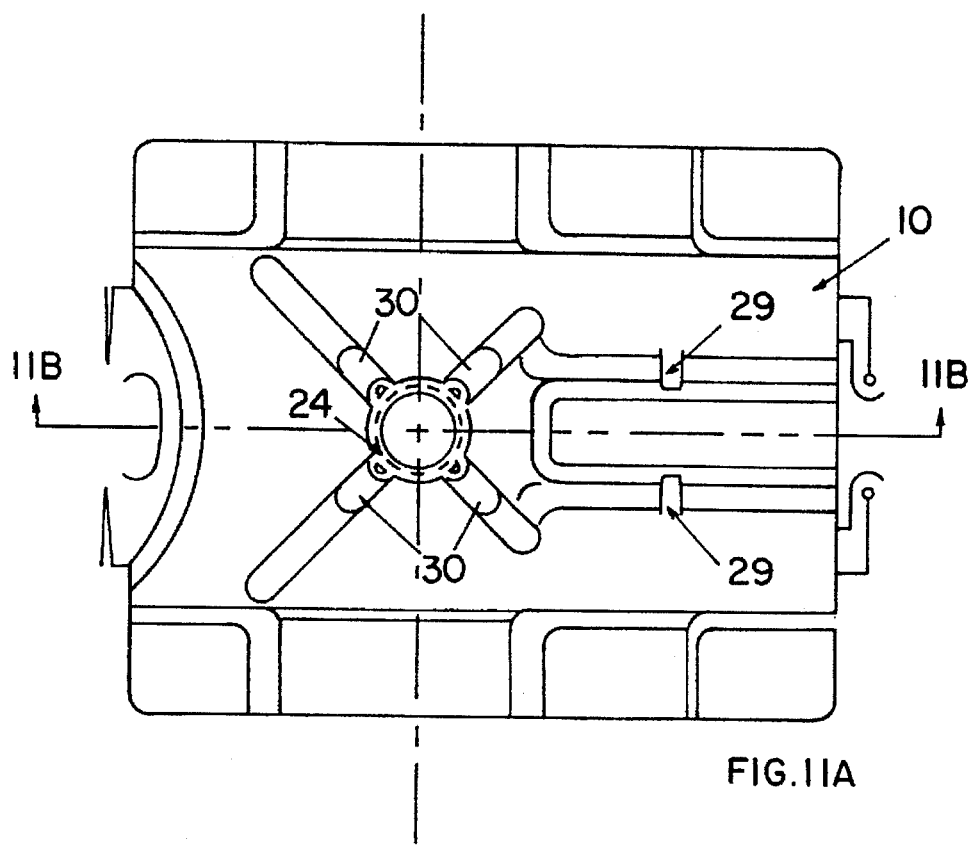

In the next stage, represented in FIGS. 11A and 11B, the following take place simultaneously or in any order:

forming integral reinforcement ribs 30 means adjacent the junction of the sleeve 24 with the respective plate 10, and forming any required additional profiles in the plate 10.

Figure 12B:
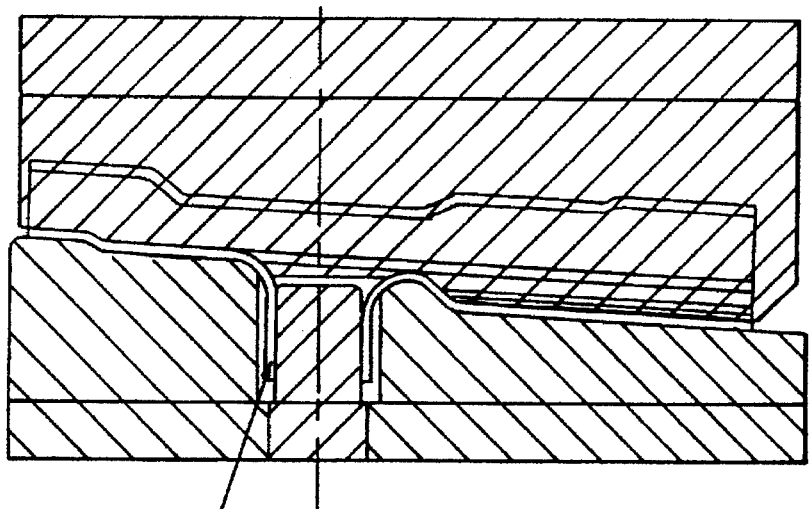
Figure 12A:
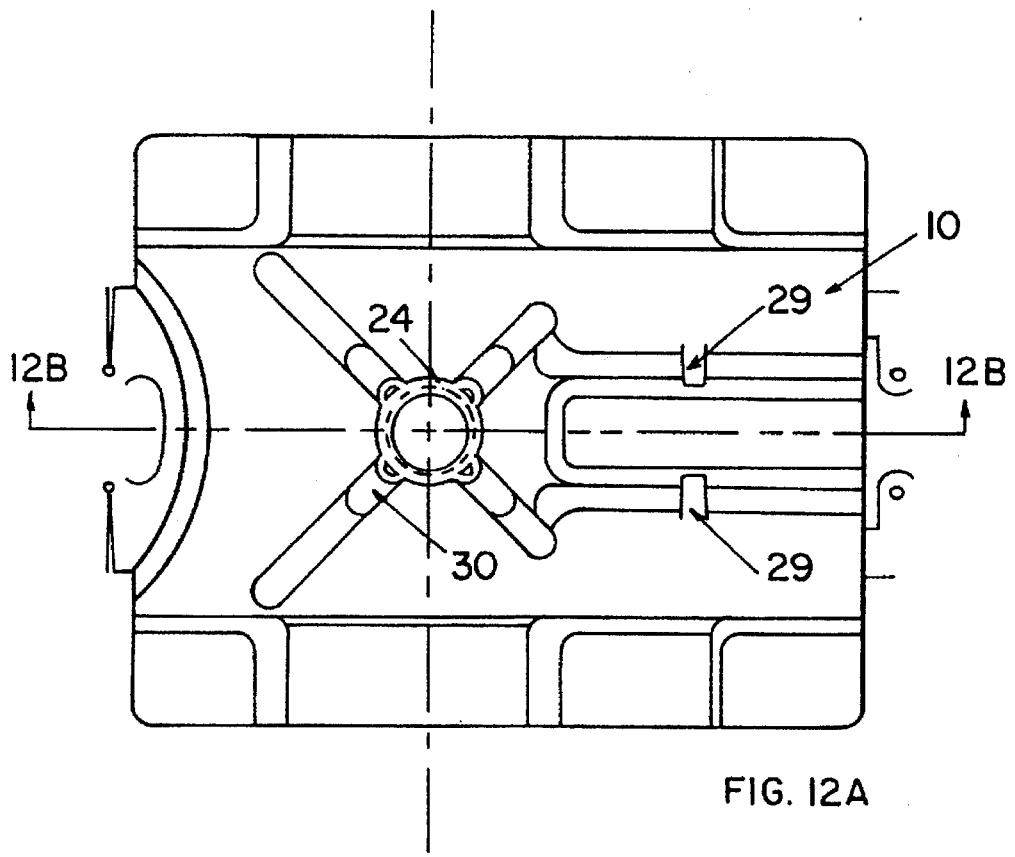
Figure 13B:
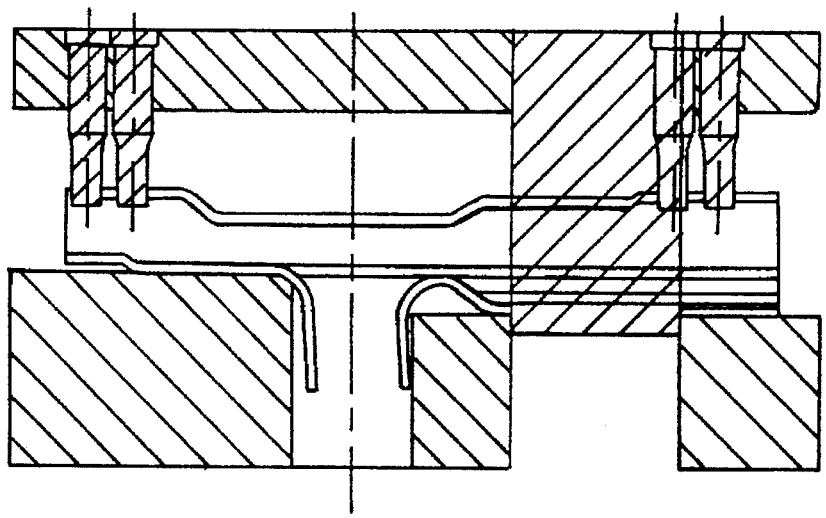
Figure 13A:
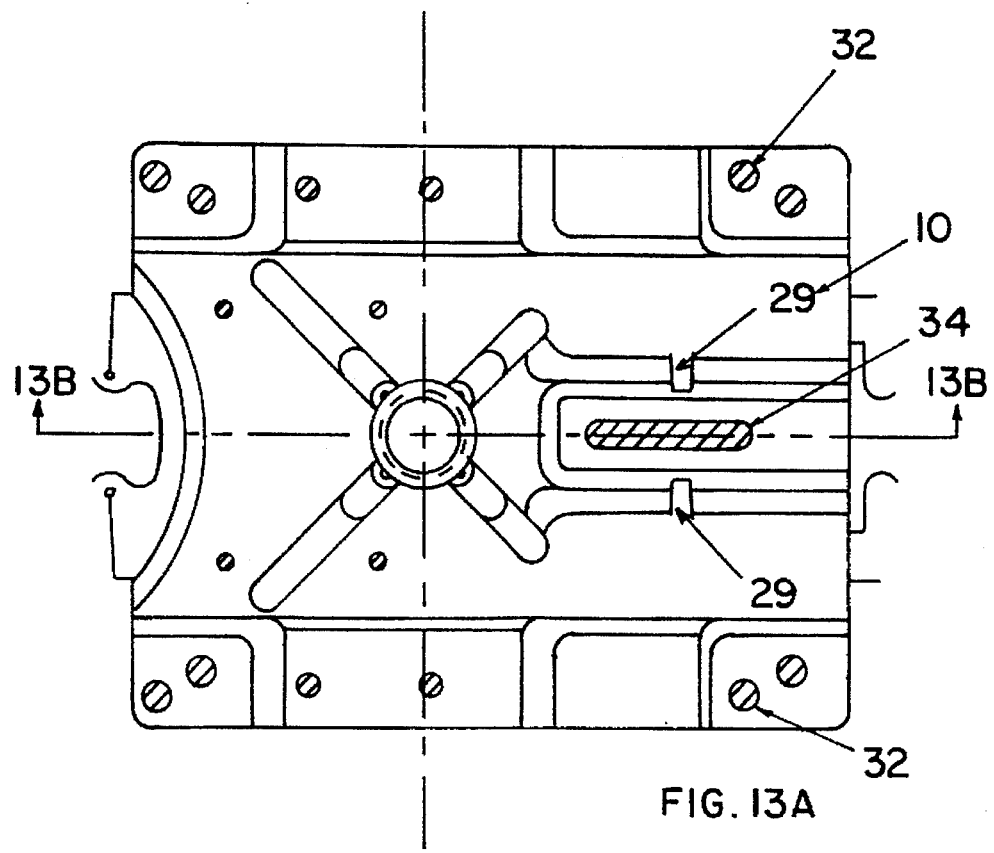

At the stage represented in FIGS. 12A and 12B, the sleeve 24 is given a taper of a predetermined angle. In FIGS. 13A and 13B all required mounting holes and all required slots are pierced in the plate, in any desired order. In FIG. 13A, holes 32 and slot 34 are typical of the requirements of a seatplate.

In a preferred embodiment of this invention, the stage represented in FIGS. 11A and 11B is also that at which the sleeve 24 is given a tilt of substantially three degrees off perpendicular with respect to the plate, by a step of coining the material around the sleeve. The three degree tilt is typical of requirements in the industry (see especially FIG. 11B).

Figure 14B:
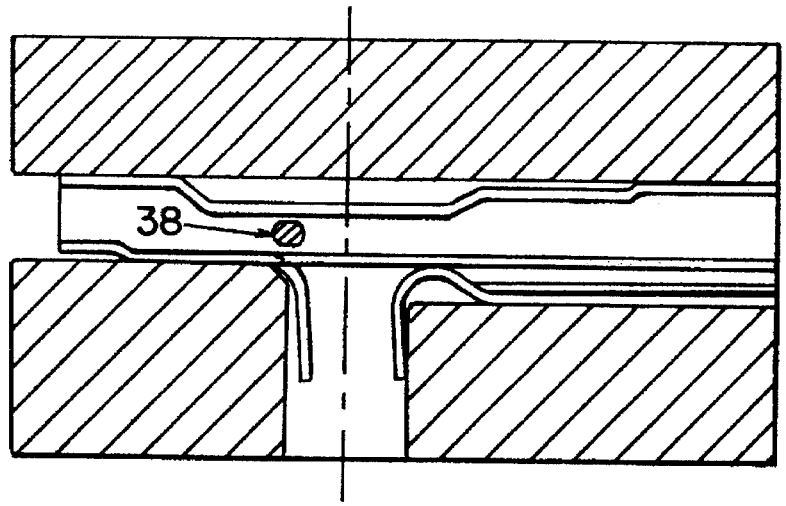
Figure 14A:
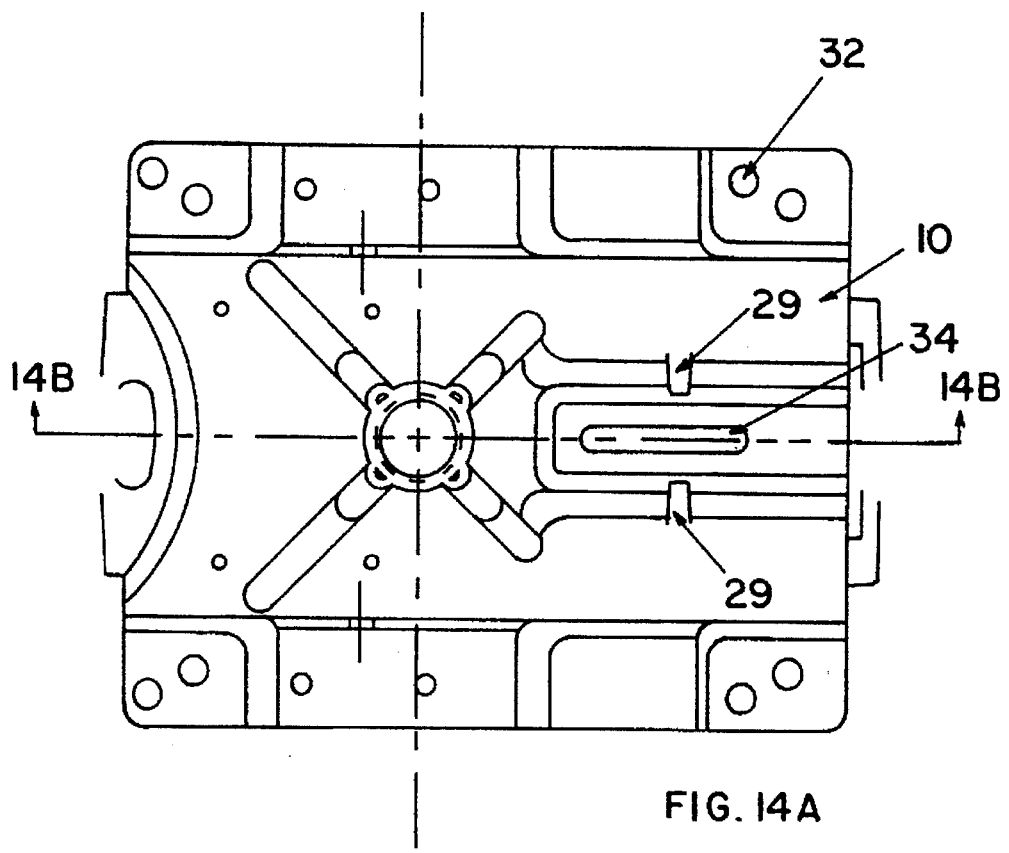

At the stage represented by FIGS. 14A and 14B, a positioning hole 38 is pierced for the height adjustment lever.

At the stage represented by FIGS. 15A and 15B, the final form of the two safety tabs 29, lanced on the plate 10, is attained.

Finally, following the stage represented by FIGS. 15A and 15B, the individual plates 10 are cut away from the remainder of the strip.

Figure 16:
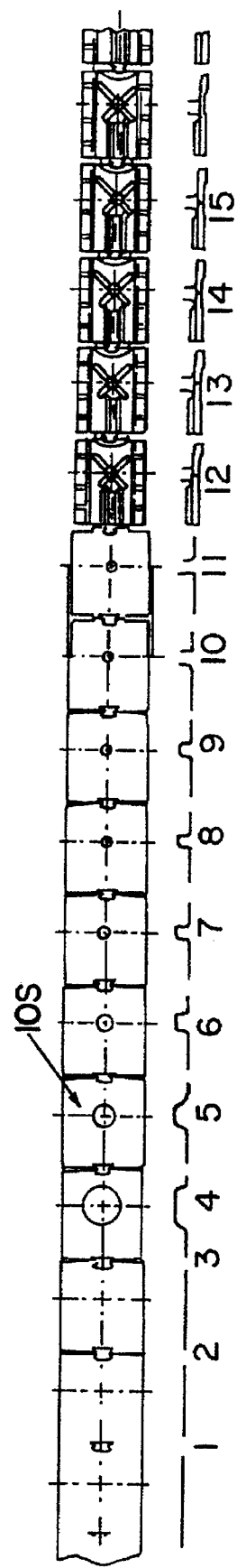
FIG. 16 is schematic view of an elongate portion of the strip of metallic material, showing the gradual deformation of the flat strip as it moves from left to right through the various forming stations.

For an overview of the method disclosed herein, attention is directed to FIG. 16, which is a top plan schematic of a strip 10s of deformable metallic material (such as deformable steel).

The essential characteristics of a longitudinal vertical section through the strip are shown below the strip 10s in FIG. 16, and numerals 1 through 14 have been placed under the sectional views, in order to identify the stages (and corresponding figure numbers) which relate to the various steps.

The three plates shown to the right of the plate identified as 15 in FIG. 16 are simply awaiting removal and further processing, and do not represent specific stages or steps.

Figure 8B:
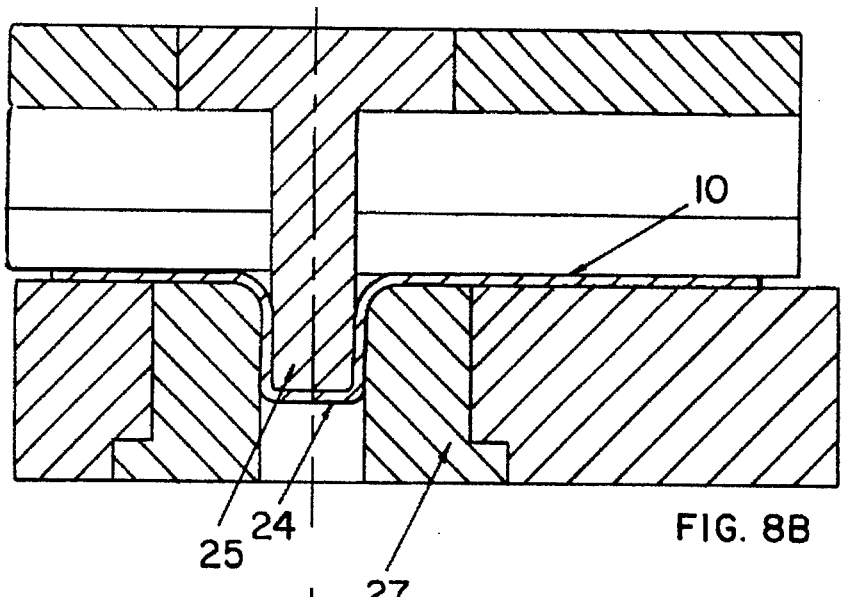
Figure 8A:
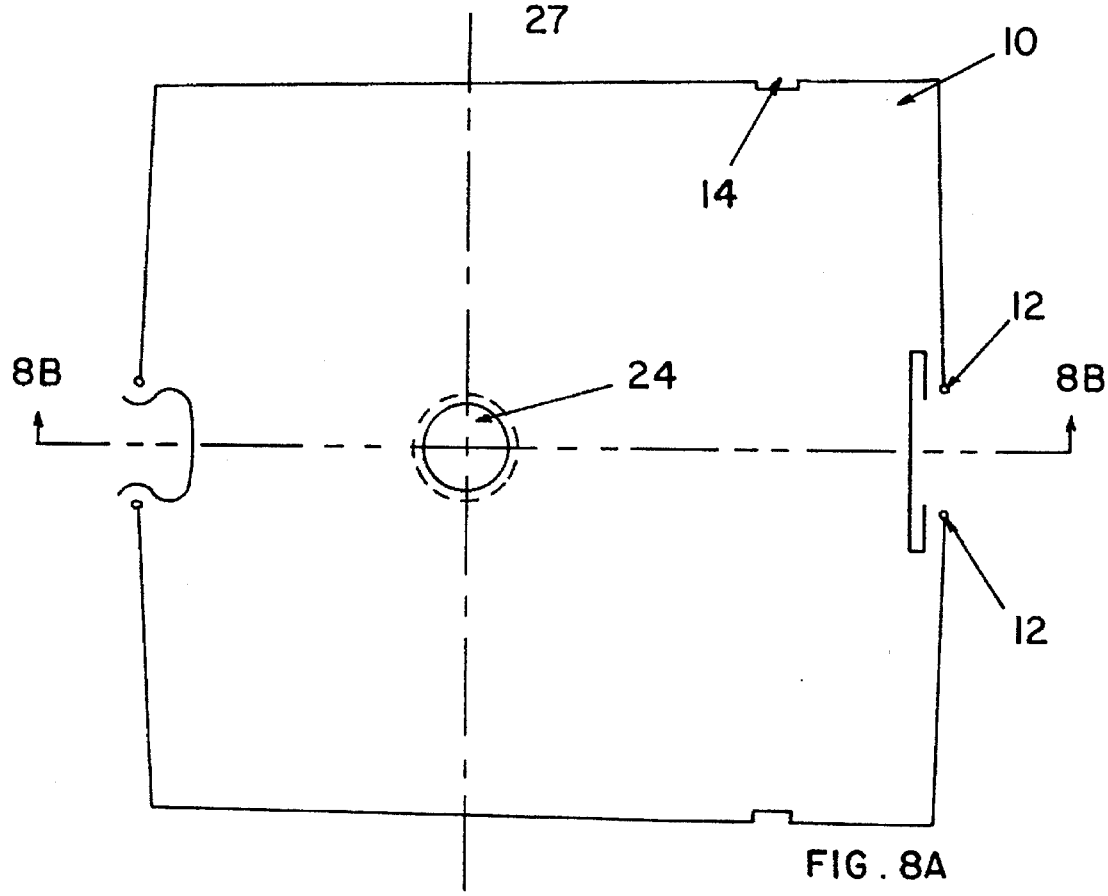

With reference to FIGS. 4A,B through 9A,B, it is important to point out that the material of the plate must flow to the centre of the plate by applying pressure on a male punch which will then draw and make the material flow into a female orifice. This is partly illustrated in FIG. 8, where the male punch has the numeral 25 and the female orifice has the numeral 27.

By providing a substantially large number of individual stages where the potential sleeve is being drawn out of the metal plate in small steps, it is found that the present process does not produce or show any fractures or thinning of the material thickness in the walls of the sleeve 24, this being very important from the safety standpoint.

While one embodiment of this invention has been illustrated in the accompanying drawings and disclosed hereinabove, it will be evident to those skilled in the art that changes and modifications may be made therein, without departing from the essence of this invention as set forth in the appended claims.

The embodiments of the invention in which an exclusive property or privilege is claimed are defined as follows:

1. A method of making a plurality of integral support plates for use in constructing chair seats, the method comprising passing a strip of deformable metallic material along a forming line and carrying out a series of operations on the strip, the operations being experienced by the strip as a predetermined sequence of groups of operations, each group containing one or a plurality of operations, the groups including, in order:
   a) a first group comprising, in any order:
      piercing two laterally spaced-apart lancing holes in a middle region of the strip,
      removing material adjacent to the holes to provide an opening for a strip carrier, and
      providing a modality adjacent at least one of the opposed longitudinal sides of the strip for cooperation with a safety switch;
   b) a second group having the effect of lancing the strip along two substantially transverse lines reaching from the longitudinal sides to corresponding lancing holes, thus facilitating the flow of strip material during subsequent operations, said transverse lines generally identifying the rearward edge of a leading support plate and the forward edge of the next subsequent support plate;
   c) a third group comprising a plurality of sequential operations for creating, in a mid-region of the leading plate, an integral, cylindrical, closed-ended sleeve of which the axis extends substantially perpendicular to the plate, said sequential operations utilizing a plurality of sets of male and female die members, the sequential operations commencing with the formation of a relatively shallow, wide bubble in the plate, followed by the deepening and narrowing of the bubble by the sequential operation of said sets of die members;
   d) a fourth group comprising, in any order:
      using a piercing tool to remove the closed end of the sleeve of the leading plate, and
      trimming away excessive edge material so as to give the leading plate a desired peripheral configuration;
   e) a fifth group comprising, simultaneously or in any order:
      forming reinforcement rib means adjacent the junction of the sleeve with the leading plate, and
      forming any required additional profiles in the leading plate;
   f) a sixth group comprising, in any order:
      piercing all required mounting holes in the leading plate, and
      piercing all required slots in the leading plate; and
   g) a seventh group comprising cutting a completed leading support plate from the strip.

2. The method claimed in claim 1, in which said fifth group further includes the step of coining the material around the sleeve in order to give the sleeve a tilt of substantially 3 degrees off perpendicular with respect to the leading plate.

3. The method claimed in claim 2 in which, in the fourth group, the step of trimming away the excessive edge material involves the edge material around a rear portion of the leading plate, and a front portion of the next subsequent plate.

4. The method claimed in claim 3 in which said fifth group further includes the step of coining the inside of the sleeve in order to give the sleeve an outward taper.

5. The method claimed in claim 1, in which, in the fourth group, the step of trimming away the excessive edge material involves the edge material around a rear portion of the leading plate, and a front portion of the next subsequent plate.

6. The method claimed in claim 1, in which said fifth group further includes the step of coining the inside of the sleeve in order to give the sleeve an outward taper.

7. Apparatus for making a plurality of integral support plates for use in constructing chair seats, the apparatus defining a forming line along which a strip of deformable metallic material can be passed, the apparatus being adapted to carry out a series of operations on the strip, the operations being experienced by the strip as a predetermined sequence of groups of operations, each group containing one or a plurality of operations, the apparatus comprising groups of mechanisms arranged along the forming line in the order in which they are experienced by the moving strip, said groups of mechanisms including, in order:
   a) a first group comprising, for use in any order:
      piercing means for piercing two laterally spaced-apart lancing holes in a middle region of the strip,
      punching means for removing material adjacent to the holes to provide an opening for a strip carrier, and means for providing a modality in the opposed longitudinal sides of the strip for cooperation with a safety switch;

b) a second group including lancing means for lancing the strip along two substantially transverse lines reaching from the longitudinal sides to corresponding lancing holes, thus facilitating the flow of strip material during subsequent operations, said transverse lines generally identifying the rearward edge of a leading support plate and the forward edge of the next subsequent support plate;

c) a third group comprising a plurality of sets of male punches and corresponding female dies, said sets being adapted to create, in a mid-region of the leading plate, an integral, cylindrical, closed-ended sleeve of which the axis extends substantially perpendicular to the plate, the creation of the close-ended sleeve being accomplished by sequential operations commencing with the formation of a relatively shallow, wide bubble in the plate, followed by the deepening and narrowing of the bubble by the sequential operation of said sets of die members;

d) a fourth group comprising:

a piercing tool to remove the closed end of the sleeve of the leading plate, and trimming means for trimming away excessive edge material so as to give the leading plate a desired peripheral configuration;

e) a fifth group comprising:

punch and die means for forming reinforcement rib means adjacent the junction of the sleeve with the leading plate, and for forming any required additional profiles in the leading plate;

f) a sixth group comprising, in any order:

further piercing means for piercing all required mounting holes in the leading plate, and for piercing all required slots in the leading plate; and g) a seventh group comprising cutter means for cutting a completed leading support plate from the strip.

* * * * *